(12) United States Patent
Buettner

(10) Patent No.: US 8,147,258 B2
(45) Date of Patent: Apr. 3, 2012

(54) ADAPTER FOR ACCOMMODATING ELECTRICAL INSTALLATION DEVICES AND FOR FIXING TO A CONDUCTOR RAIL SYSTEM

(75) Inventor: Alex Buettner, Roedental (DE)

(73) Assignee: Woehner GmbH & Co., KG Elektrotechnische Systeme, Roedental (GB)

( * ) Notice: Subject to any disclaimer, the term of this patent is extended or adjusted under 35 U.S.C. 154(b) by 21 days.

(21) Appl. No.: 12/859,539

(22) Filed: Aug. 19, 2010

(65) Prior Publication Data

US 2011/0065295 A1   Mar. 17, 2011

(30) Foreign Application Priority Data

Sep. 14, 2009 (DE) .................. 10 2009 029 434

(51) Int. Cl.
*H01R 25/00* (2006.01)
*H01H 71/20* (2006.01)
(52) U.S. Cl. ........................ 439/121; 337/196
(58) Field of Classification Search .......... 439/121, 439/122, 721; 200/172, 337; 337/181, 196
See application file for complete search history.

(56) References Cited

U.S. PATENT DOCUMENTS

| 8,021,171 B2 * | 9/2011 | Buettner | 439/121 |
| 2010/0233893 A1 * | 9/2010 | Buettner | 439/121 |

FOREIGN PATENT DOCUMENTS

| DE | 4125438 A1 | 2/1993 |
| DE | 29615341 U1 | 9/1996 |
| DE | 19836383 C1 | 11/1998 |
| DE | 10315503 B3 | 11/2004 |
| DE | 102005009857 B3 | 10/2006 |
| EP | 0762583 A2 | 3/1997 |
| EP | 1764872 A2 | 8/2006 |

OTHER PUBLICATIONS

Office Action from corresponding German Application No. 10 2009 029 434.1-34, filed Sep. 14, 2009.
Extended Search Report from of the European Patent Office for Patent No. 10172653.7 dated Nov. 17, 2010.

* cited by examiner

*Primary Examiner* — Khiem Nguyen
(74) *Attorney, Agent, or Firm* — Westman, Champlin & Kelly, P.A.

(57) ABSTRACT

The invention relates to an adapter for accommodating electrical installation devices and for fixing to a conductor rail system, comprising a housing which is made of plastics material and comprises an upper housing wall on which means for mounting an electrical installation device are provided, comprising feet for fixing to the conductor rail system by gripping, comprising a first contact member for connecting the electrical installation device, the first contact member extending at least substantially within the housing, and comprising a second contact member, electrically connected to the first contact member, for contacting a respective one of the conductor rails of a conductor rail system, characterised in that the housing comprises a guide recess, the second contact member being provided so as to be displaceable along said recess within the housing, in that the second contact member comprises a guide means and catch means, and in that catch recesses, with which the catch means of the second contact member can be brought into engagement, are provided in predetermined catch positions of the housing.

20 Claims, 9 Drawing Sheets

Figure 1:
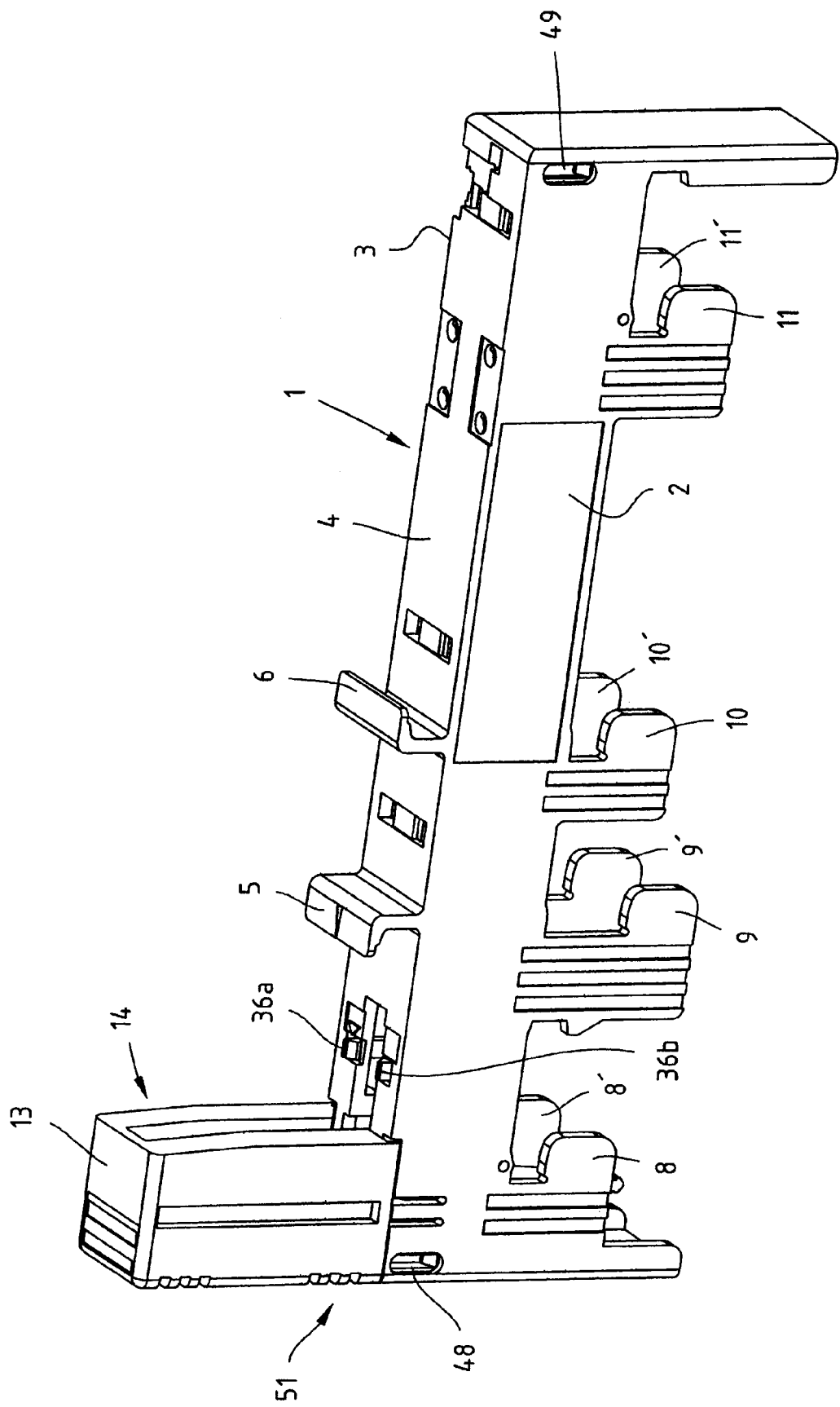

ADAPTER FOR ACCOMMODATING ELECTRICAL INSTALLATION DEVICES AND FOR FIXING TO A CONDUCTOR RAIL SYSTEM

The present application claims priority of German patent application Serial No. 102009029434.1, filed Sep. 14, 2009, the content of which is hereby incorporated by reference in its entirety.

The invention relates to an adapter for accommodating electrical installation devices and for fixing to a conductor rail system.

There are already known adapters which are constructed with one pole, which can be positioned on conductor rail systems and which are constructed at the upper side thereof to accommodate electrical installation devices. Such an adapter has a housing having side walls and a wall which forms the upper side and on which there are arranged L-shaped rails which are directed away from each other and which serve to accommodate an electrical installation device. Recesses for positioning on conductor rails are formed in the side walls of the housing. Such an adapter is provided at a predetermined position with a fixedly arranged contact member which is intended to contact a predetermined conductor rail of the conductor rail system. Another contact member in the form of a contact rail is located below the upper wall of the housing and is provided with a connection cable extending out of the housing for connection to an installation device. Feet which can be displaced in the longitudinal direction of the housing serve to fix the adapter in position inside the housing. Those feet can be displaced by a handle which extends out of the housing in order to engage under conductor rails, whereby the adapter is securely clamped relative to the conductor rails. Such an adapter has only a single contact member which is provided for contacting one of the conductors L1, L2, L3, N or PE, which means that it is necessary to provide adapters having contact members which are arranged securely in different manners for contacting the different conductors.

The problem addressed by the invention is to provide an adapter of the type mentioned in the introduction which can be adjusted in order to contact various conductors.

That problem is solved according to the invention by an adapter for accommodating electrical installation devices and for fixing to a conductor rail system, comprising a housing which is made of plastics material and comprises an upper housing wall on which means for mounting an electrical installation device are provided, comprising feet for fixing to the conductor rail system by gripping, comprising a first contact member for connecting the electrical installation device, the first contact member extending at least substantially within the housing, and comprising a second contact member, electrically connected to the first contact member, for contacting a respective conductor rail of a conductor rail system, characterised in that the housing comprises a guide recess, the second contact member being provided so as to be displaceable along said recess within the housing, in that the second contact member comprises a guide means and catch means, and in that catch recesses, with which the catch means of the second contact member can be brought into engagement, are provided in predetermined catch positions of the housing.

According to a preferred embodiment, the adapter is configured in such a manner that the first contact member includes a contact rail, which extends below the upper housing wall in the housing and is provided with a connection means.

According to another embodiment, there is provision for the second contact member to comprise an accommodating housing, on which the guide means is formed, and for the guide recesses to be provided on the inner faces of the side walls of the housing, along which faces the second contact member can be displaced using the guide means thereof.

In another embodiment, there is provision in an adapter for the accommodating housing of the second contact member to comprise at least two apertures, and for contact portions of a contact of the second contact member to be arranged in the accommodating housing and to project out of the accommodating housing at least in part.

According to another embodiment of the invention, the adapter is characterised in that the guide recesses are formed as grooves extending along the inner faces of the side walls of the housing, and in that groove portions are provided at points corresponding to the catch positions of the second contact member and extend transversely to the guide recess, into which the guide means of the accommodating housing can be slid to position the second contact member in a predetermined operating position.

According to another construction, there is provision in an adapter for the guide means on one side of the accommodating housing to be formed differently from the guide means on the other side of the accommodating housing.

In a preferred construction of the adapter, the catch means of the second contact member are formed by at least one pair of feet which protrude from the accommodating housing and the catch recesses are formed in the housing by openings in the upper housing wall.

In a preferred construction, the guide means of the second contact member are formed by cut-out flexible webs, on each of which a projection is arranged.

Advantageously in the adapter, the catch means are provided with catch teeth.

In order to improve the guiding, there is provision in one construction of the adapter for mutually separated foot portions, the spacing between which is slightly greater than the width of the first contact member, to be formed by the accommodating housing of the second contact member, whereby guiding of the second contact member relative to the rail-like first contact member is provided during displacement of the second contact member.

In order to insert the second contact member, the guide recess in the form of grooves which extend parallel with the axis of the housing is provided with a pair of insertion grooves which extend perpendicularly relative to the guiding recess.

The adapter according to the invention is preferably constructed as a one-pole adapter and comprises a plastics housing having side walls and a wall forming the upper side, which are assembled in a substantially U-like manner or have an integral construction, there being constructed along the inner face of the side walls guide grooves which preferably extend parallel with each other and which serve to accommodate guide means which are constructed laterally on a side face of the second contact member. In that manner, it is possible to displace the second contact member inside the U-shaped housing in order to become engaged relative to the housing at one of a plurality of predetermined positions so that the contacting of a predetermined conductor rail is ensured.

At the inner faces of the housing walls, at least one pair of mutually parallel guide portions which are constructed in the form of guide grooves perpendicularly relative to the guide recess is provided and extends perpendicularly relative to the first guide recess mentioned which extends in a longitudinal direction of the housing so that the second contact member can be inserted in the housing from outside and form the underside of the housing.

The second contact member comprises a plastics accommodating housing which accommodates a substantially U-shaped contact which, according to a preferred embodiment, contains a helical spring which urges apart the contact members of the U-shaped contact. The accommodating housing is provided with apertures so that the U-shaped contact can be electrically connected to the first contact member via the apertures and can form an electrical contact with respect to the conductor rail on the opposite side.

According to a first embodiment, the first contact member is in the form of a conductor rail and is bent at one end of the housing in such a manner that a substantially U-shaped connection portion is formed whilst, according to a second embodiment, the first substantially rail-like contact member is connected to a flexible connection conductor, the bent connection member and the flexible connection member serving for connection to an installation device.

Such a one-pole adapter can be connected by coupling members formed on the housing to at least one or more adapters to form an adapter module, whereby there is provided an adapter module which ensures the contacting of five conductors L1-L3, N, PE when five such assembled adapters are used.

In order to fix each adapter to the conductor rail system, according to another embodiment there is provided a locking bar which extends perpendicularly to the longitudinal direction of the adapter and which is displaced perpendicularly relative to the longitudinal direction of the housing after the adapter has been positioned on the conductor rail system, whereby locking is carried out at least relative to one conductor rail.

Figure 2:
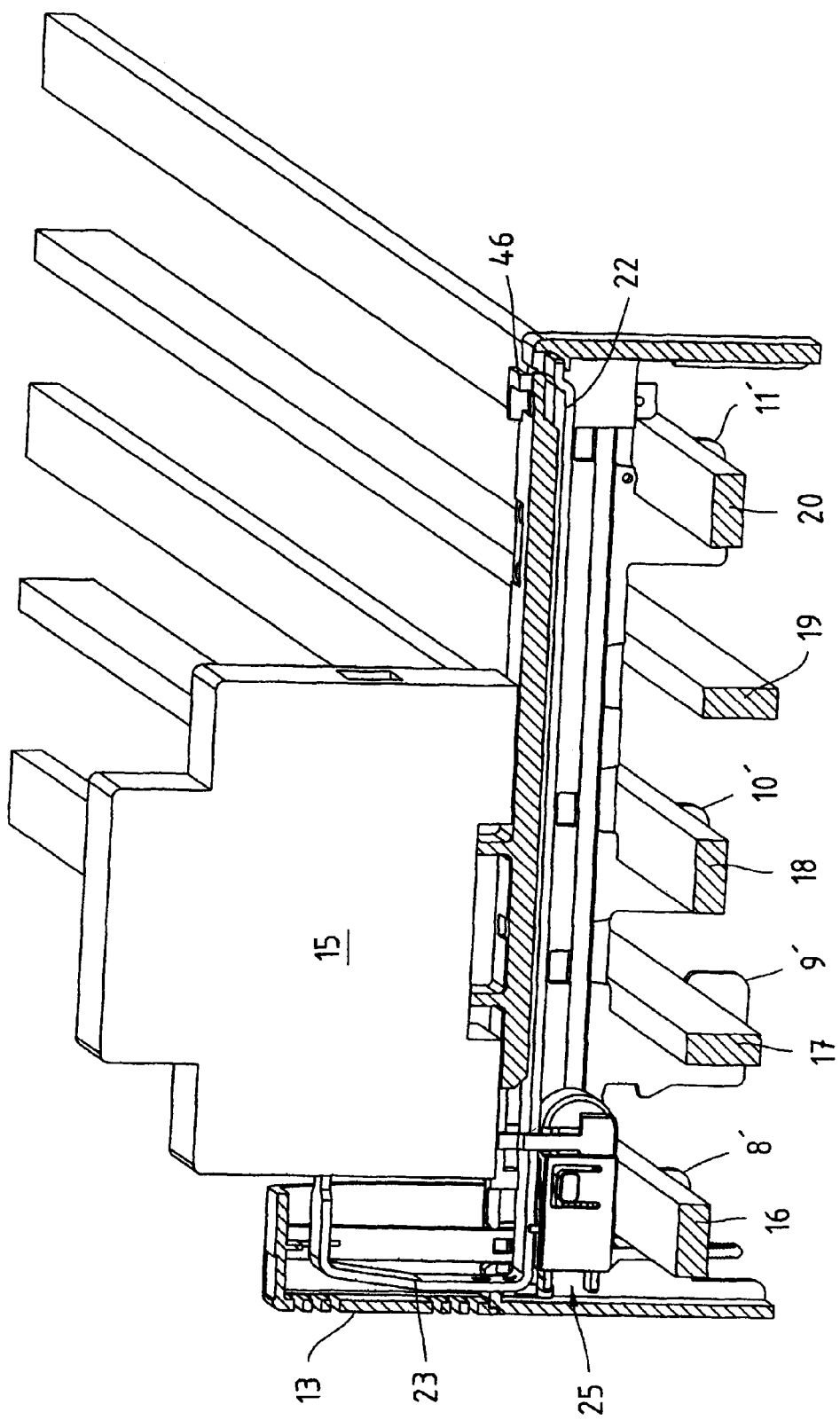
Figure 3:
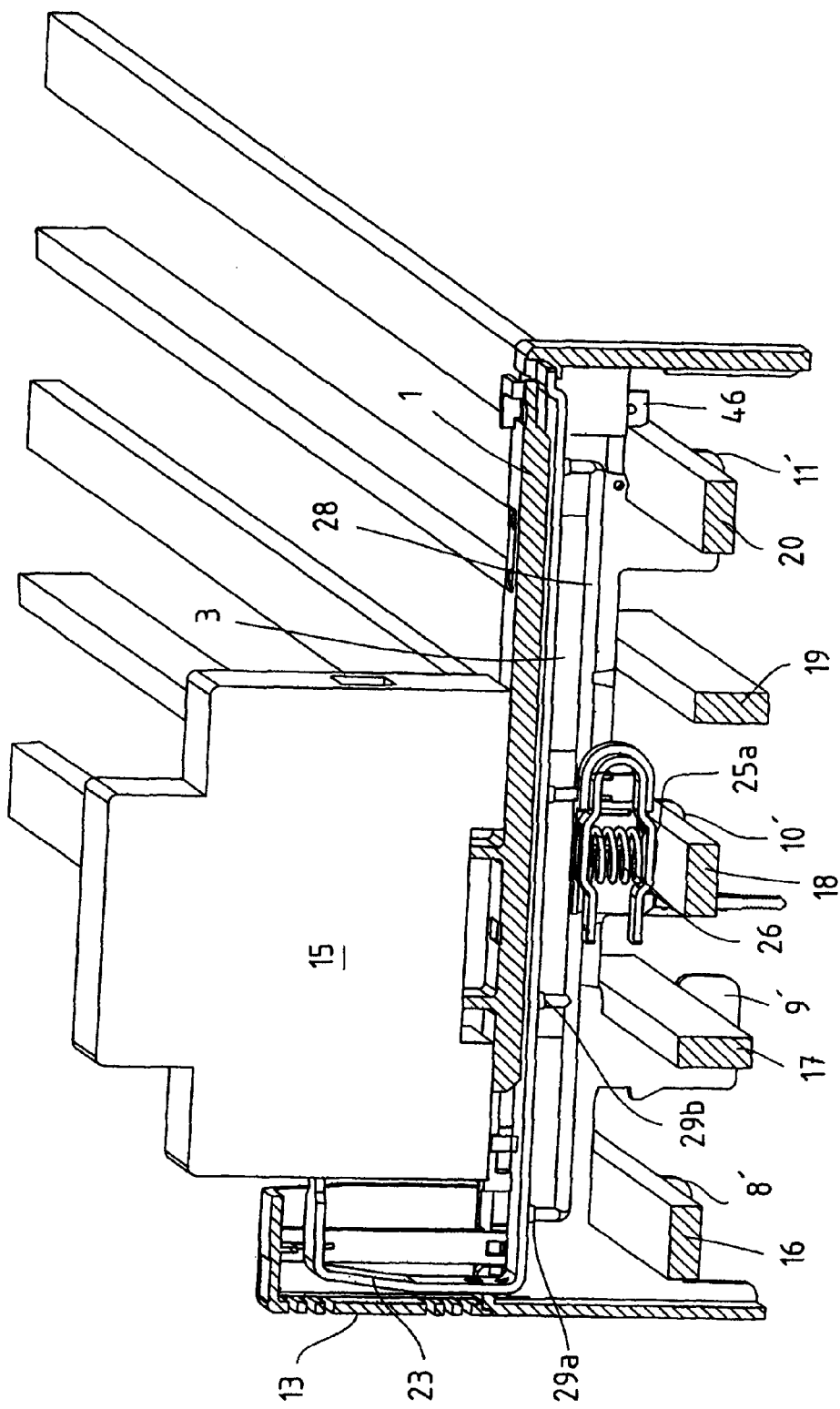
Figure 4:
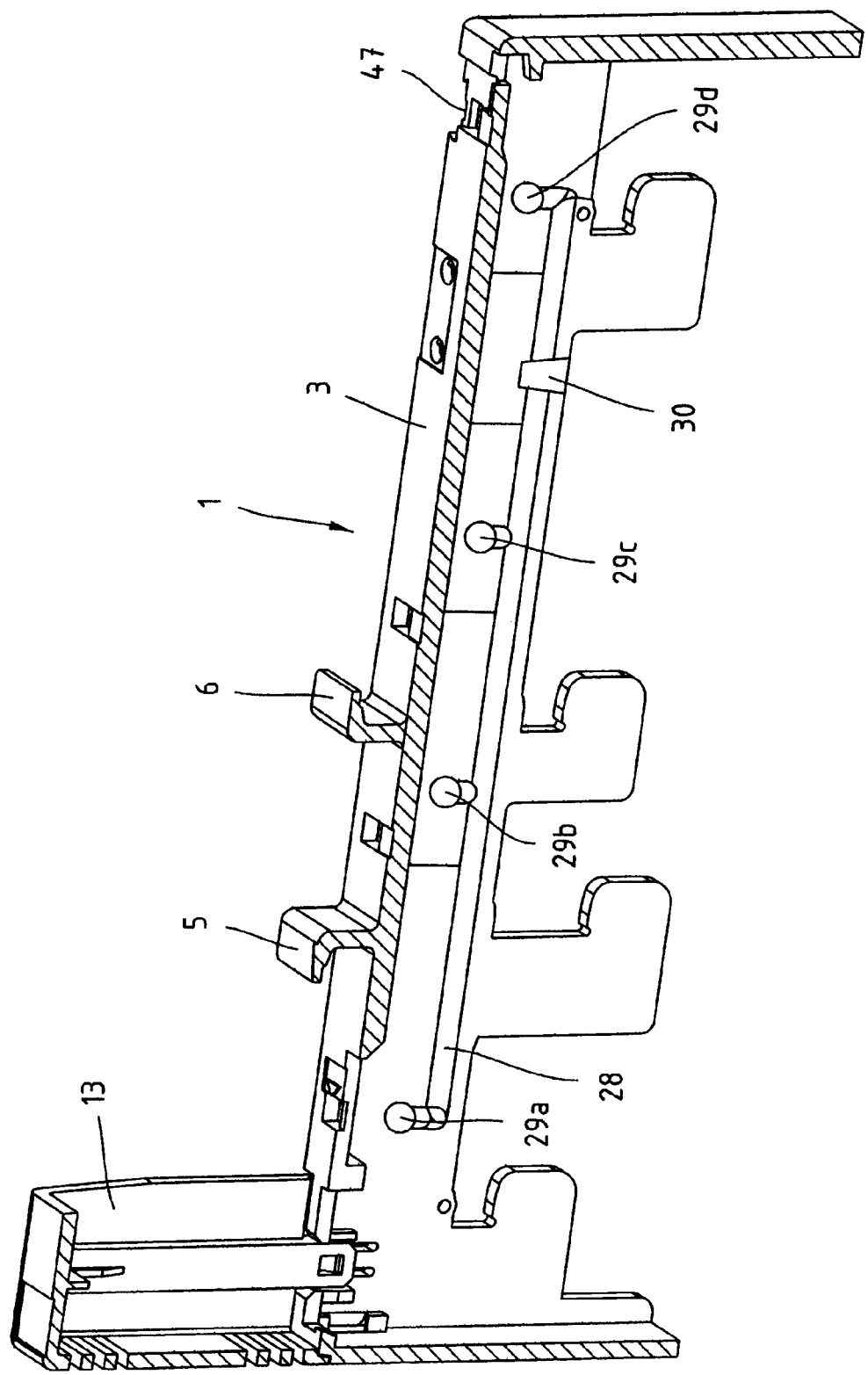
Figure 5:
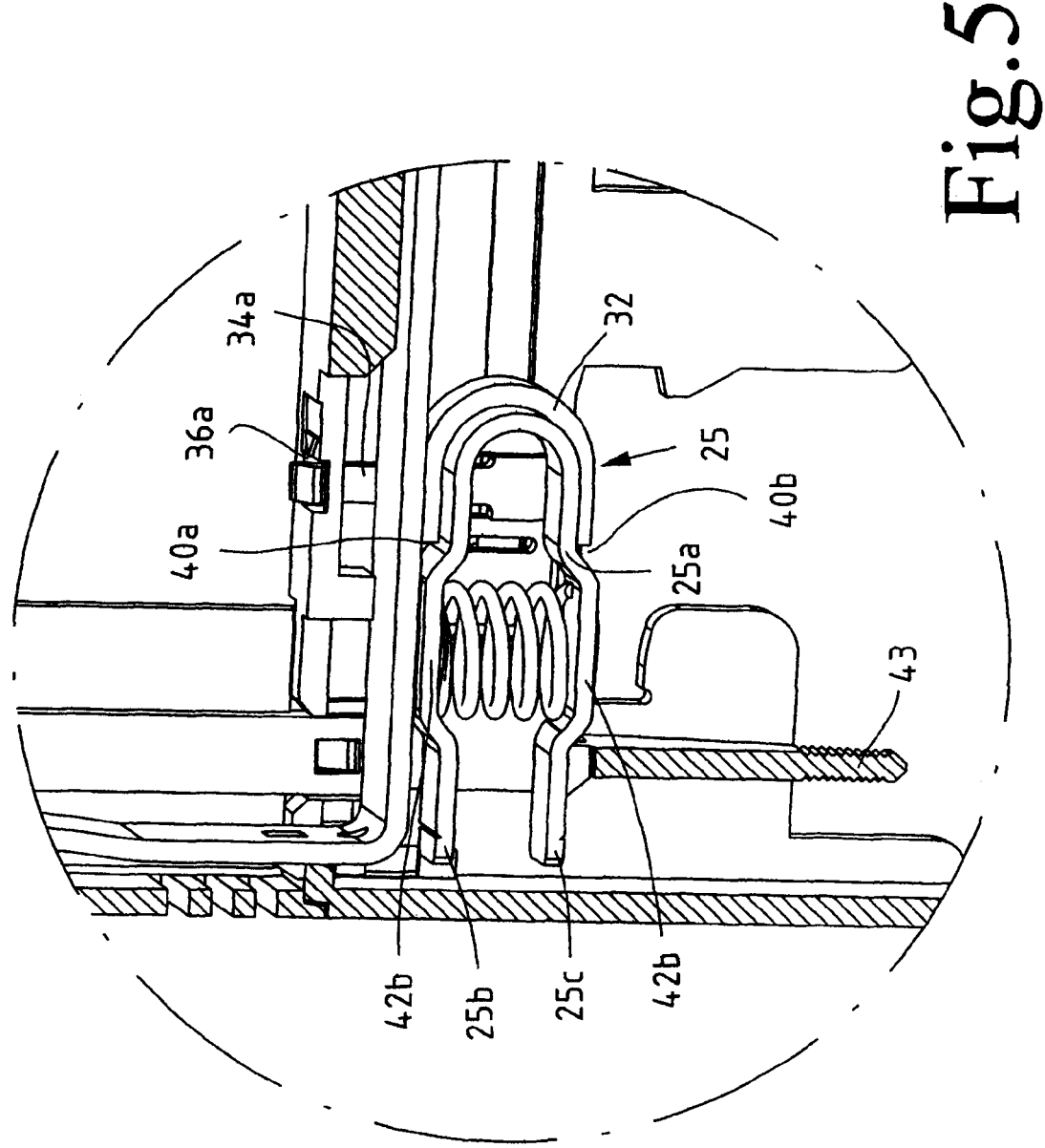
Figure 6:
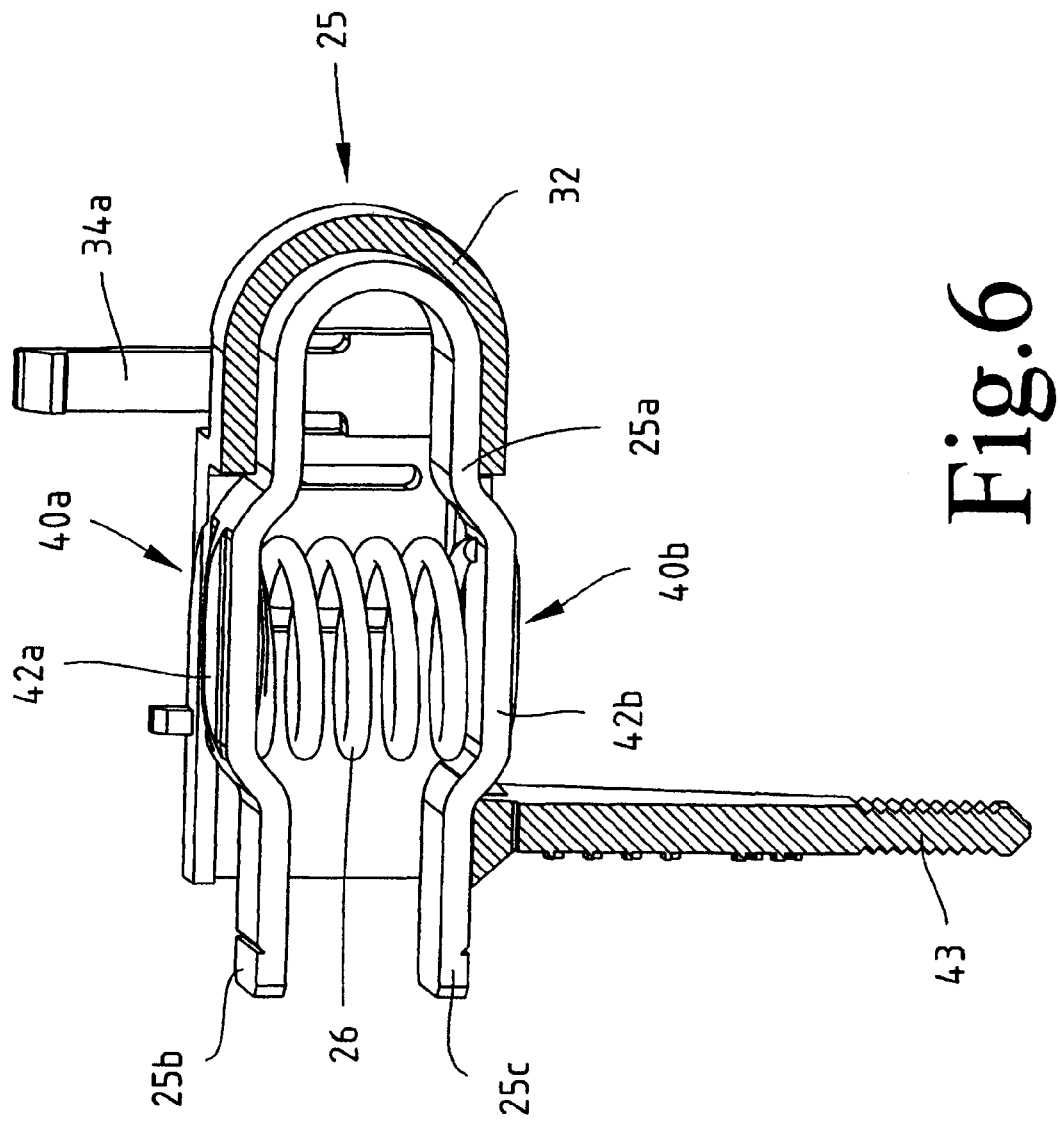
Figure 7:
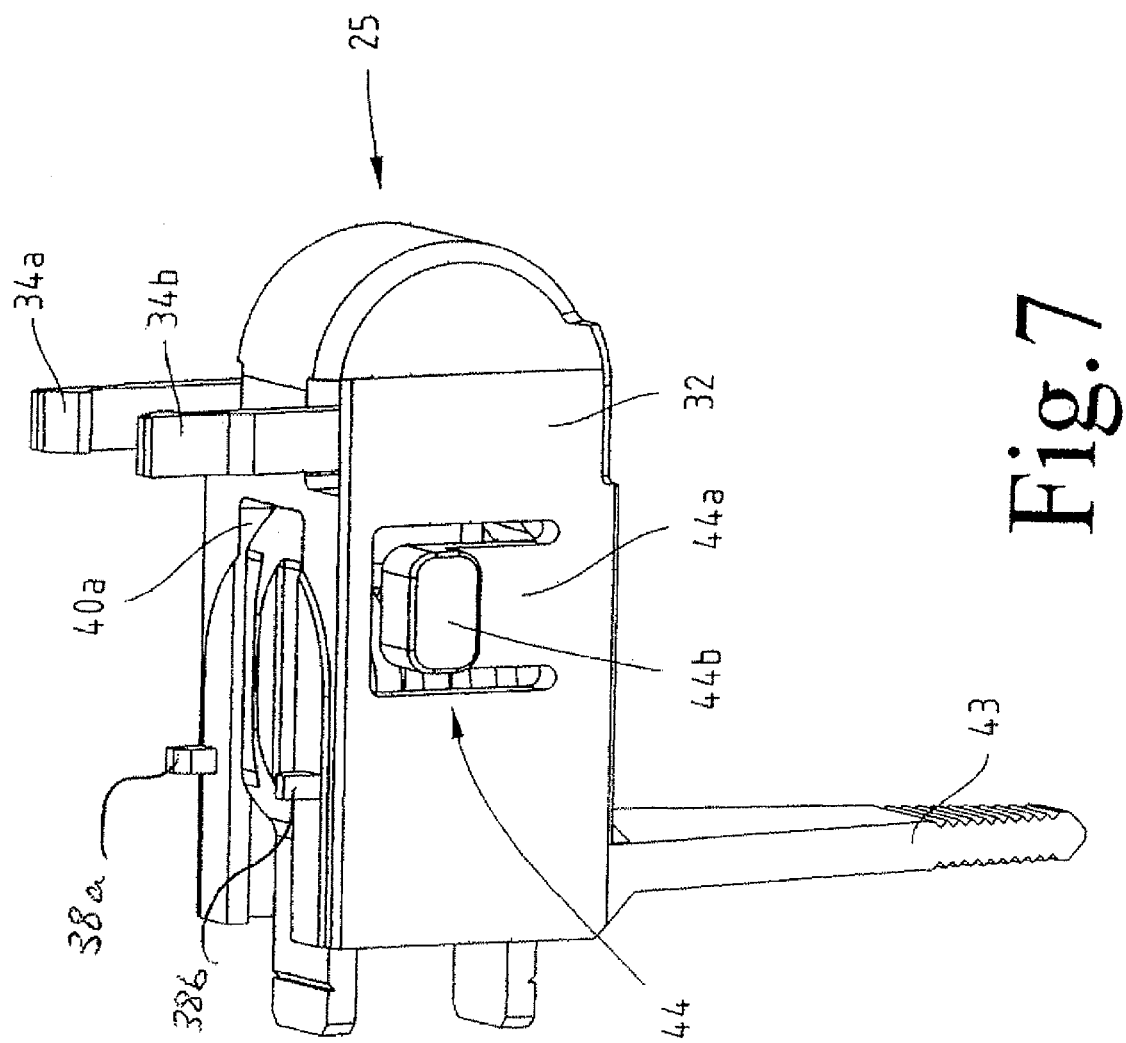
Figure 8:
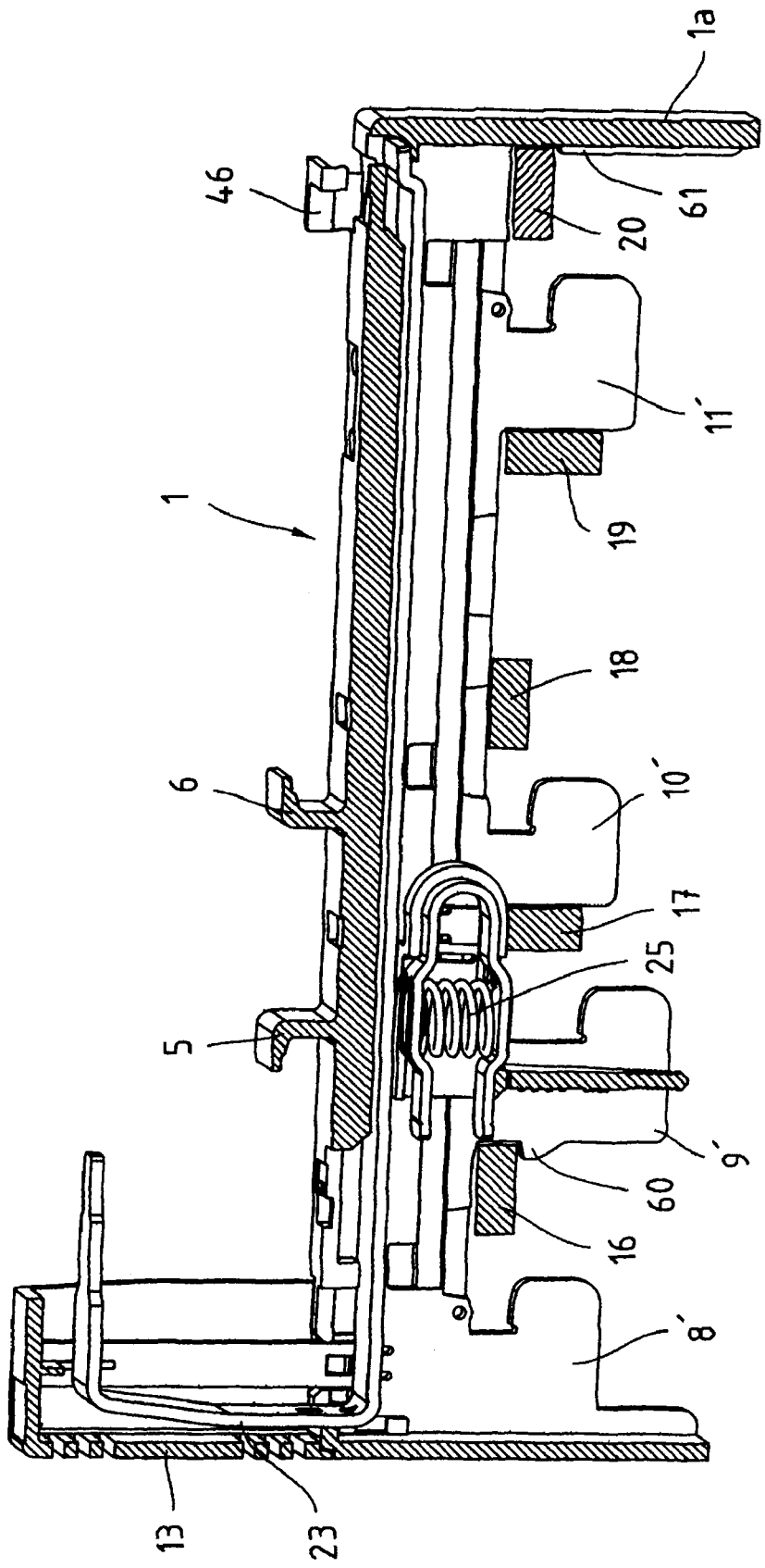
Figure 9:
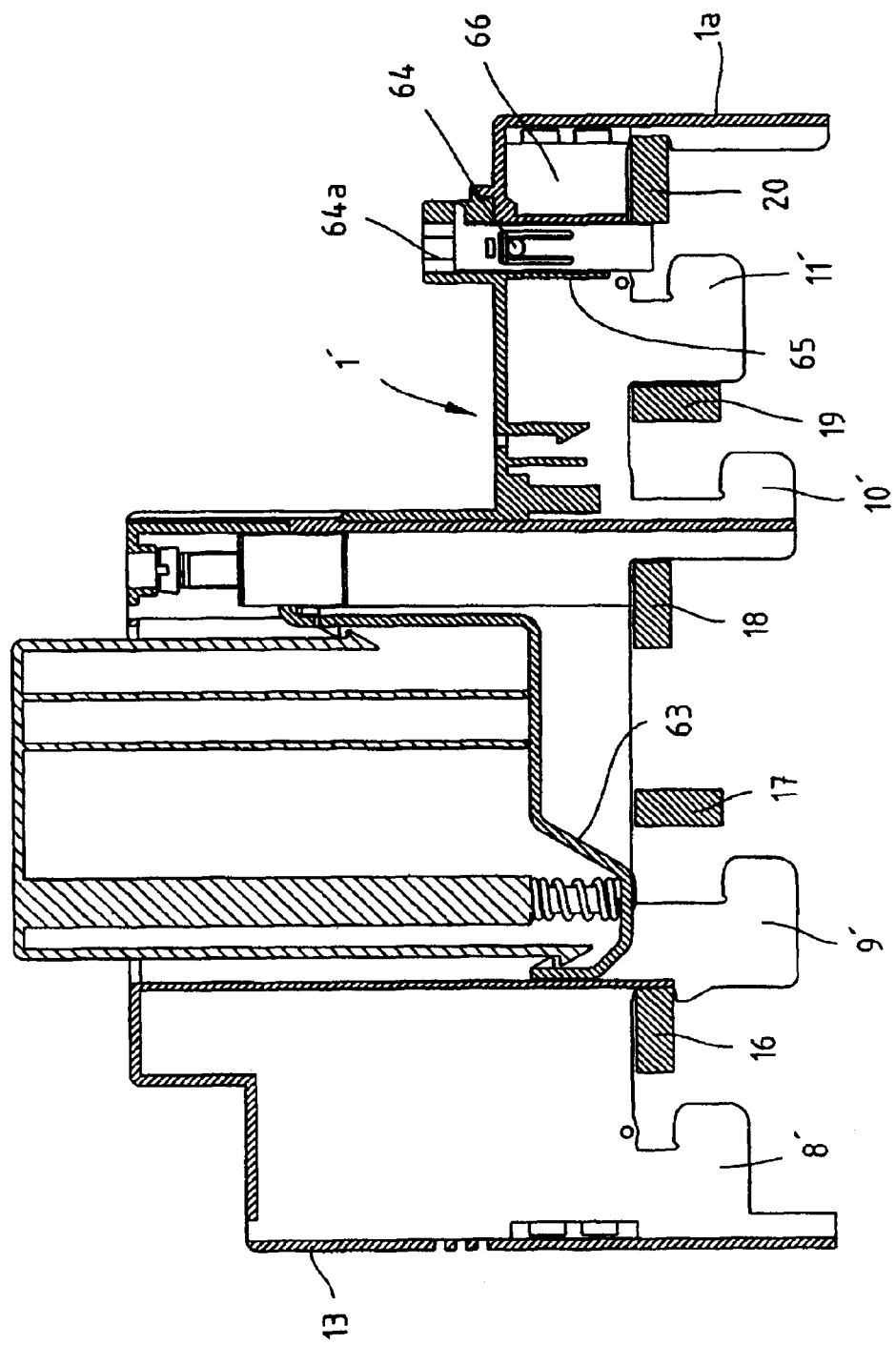

Preferred embodiments of the adapter are described below with reference to the drawings in order to explain other features. In the drawings:

FIG. 1 is a perspective view of a one-pole adapter according to a preferred embodiment, FIG. 2 is a partially sectioned perspective view of a one-pole adapter according to FIG. 1 together with an installation device and a conductor rail system, FIG. 3 is an illustration corresponding to FIG. 2 in which the second contact member is arranged so as to be displaced relative to FIG. 2, FIG. 4 is a longitudinal sectional view through the adapter module to illustrate the inner face of a side wall, FIG. 5 is a detailed view of the adapter having a second contact member in the position illustrated in FIG. 2, the second contact member being represented in section, FIG. 6 is a partially sectioned view of the second contact member, FIG. 7 is a perspective view of the second contact member, FIG. 8 is a sectional view of another development of the adapter according to the invention and FIG. 9 is a sectional view of another embodiment of the adapter according to the invention.

Preferred embodiments of the adapter preferably constructed with one pole according to the invention are described below.

FIG. 1 is a perspective view of the adapter which has a plastics housing 1 which preferably comprises two housing side walls 2, 3 and an upper housing wall 4. There are located on the upper housing wall 4 rails, preferably rails 5, 6 which are directed counter to each other in an L-like manner and which are used to accommodate an installation device. A plurality of feet 8, 9, 10, 11 extend downwards on the housing wall 2. Accordingly, the side wall 3 is provided with feet 8', 9', 10', 11'. All the feet extend downwards from the side wall 2, 3 and the individual pairs of feet 8, 8', 9, 9', 10, 10', 11, 11' are provided so as to be parallel to each other and are spaced apart from each other in accordance with the spacing of the side walls 2, 3. The feet 8 to 11, 8' to 11' serve to position the adapter on conductor rails which are not illustrated in FIG. 1.

In the preferred embodiment illustrated in FIG. 1, the adapter is provided at one end with an accommodating column 13 which extends upwards from the housing 1 and whose side wall 14 directed towards the housing 1 contains an opening, preferably a slot-like opening, from which a, for example, bent, contact portion of a contact 23 which has not yet been explained extends in order to be able to be brought into electrical contact with an installation device which is to be mounted.

In the embodiment illustrated, the housing 1 is preferably opened downwards or does not have a lower housing wall which closes the housing cavity downwards. Therefore, the housing has a substantially U-shaped cross-section.

FIG. 2 is a sectional view of the adapter according to FIG. 1, with the section being taken vertically along the longitudinal axis of the housing 1 so that the side wall 3 is visible from the interior. FIG. 2 further illustrates an installation device 15 and the conductor rails 16 to 20, it being possible for the conductor rails to be orientated partially horizontally and partially vertically. The adapter is fixed relative to the conductor rails 16 to 20 by means of the feet thereof 8', 9', 10', 11'. The feet 8', 9', 10', 11' engage under the conductor rail in each case.

The illustration according to FIG. 2 shows a first contact member 22 which is of rail-like form and which extends in the longitudinal direction of the adapter, the first contact member 22 being arranged below the upper wall 4 of the adapter and laterally having an L-shaped bent portion 23 which is arranged substantially inside the column 13 and projects laterally out of it through an opening 14 in order to be able to produce an electrical contact with respect to the installation device 15.

There is displaceably arranged inside the adapter a second contact member 25 which produces, according to FIG. 2, an electrical contact between the conductor rail 16 and the first contact member 22 and is substantially provided above the conductor rail 16 inside the adapter. The second contact member 25 has an accommodating housing 32, inside which a metal contact is arranged in a manner which has not yet been described.

As is evident from FIG. 2, a contact is produced between the conductor rail 16 and the first contact member 22 after the second contact member 25 has been inserted in the housing 1 in the position shown therein so that an electrical connection exists between the conductor rail 16 and the portion 23 with respect to the installation device 15. The housing visible in FIG. 2 corresponds to one half of the accommodating housing 32, the front portion of the accommodating housing being cut-away in order to illustrate the construction and the possible insertion of the second contact member 25.

FIG. 3 is an illustration similar to FIG. 2, in which the second contact member 25 is arranged at a position which corresponds to the conductor rail 18 and in which the accommodating housing 32 of the second contact member 25 is illustrated as a cross-section with the front portion being omitted, which allows a substantially U-shaped contact 25a located in the second contact member 25 to be seen. The metal contact 25a preferably accommodates a helical spring 26 which causes the two members of the contact 25 to be urged apart, and a good electrical contact between the first contact member 22 and the conductor rail 18 is thereby produced. In place of the helical spring 26, it is possible to use other resilient means and optionally the helical spring 26 may also be dispensed with.

The housing side wall 3 visible in FIG. 3 is provided at the inwardly directed face thereof with a recess or groove 28 which is referred to below as a groove and substantially extends in the longitudinal direction of the housing 1. This groove 28 acts as a guide recess, as described below. The groove 28 is provided with groove portions 29a, 29b, 29c and 29d which extend perpendicularly upwards from it (FIG. 3) with predetermined spacing. FIG. 4 gives details of that groove 28 and the groove portions 29a, 29b, 29c and 29d.

The groove portions 29a to 29d are provided at predetermined positions along the housing 1 and in particular along the housing wall 2 and 3 in such a manner that the second contact member 25 can be engaged securely in the housing 1 at those predetermined positions, that is, at positions which ensure the contacting between the desired conductor rail and the first contact member 22. The groove 28 is further connected to an insertion groove 30 which can be formed alternatively by a slot and serves to introduce the second contact member 25 into the housing. The structure visible in FIG. 4 is accordingly produced in the housing wall 2 in a mirror-symmetrical manner. Reference is made to the following description in this regard.

In the embodiment illustrated, the housing has a substantially L-shaped form, it being possible to dispense with the accommodating column designated 13 in a preferred embodiment, particularly if the first contact member 22 does not have a bent portion 23, but instead has a flexible connection cable.

FIGS. 5 to 7 show a preferred embodiment of the second contact member 25. FIG. 5 shows the insertion of the second contact member 25 with a portion of the housing 1, the second contact member 25 being inserted at a position in the housing 1 that can be taken from the illustration in FIG. 2 in order to contact the conductor rail 16. The conductor rail 16 is not shown in FIG. 5 for greater clarity. According to FIGS. 5 to 7, the second contact member 25 has an accommodating housing 32 which comprises plastics material or another insulating material and in which the contact 25a is inserted. According to FIGS. 5 to 7, the accommodating housing 32 is provided with catch means which are formed by two feet 34a, 34b in the embodiment illustrated and which protrude preferably perpendicularly upwards from the accommodating housing 32. FIG. 5 shows the state of the second contact member 25 before the definitive engagement with respect to the housing, that is to say, the foot 34a is below a catch recess 36a, preferably in the form of an opening, through which the foot 34a in FIG. 5 can be directed upwards, after which the foot 34a is engaged relative to the housing and in that position the second contact member 25 is secured relative to the housing 1. The same applies to the other foot 34b and the catch recess 36b. The catch recesses 36a, 36b, preferably in the form of openings, are illustrated in FIG. 1 in relation to the position shown in FIGS. 2 and 5. Corresponding catch recesses are in the upper housing wall 4 for the other three positions which are not, however, indicated in greater detail for the sake of clarity. The apertures or openings which form the catch recesses 36a, 36b are provided in the upper housing wall 4 with mutual spacing which corresponds to the spacing of the feet 34a, 34b. In a preferred embodiment, it is further possible to provide, at the side facing away from the feet 34a, 34b, feet portions 38a, 38b which are shorter than the feet 34a, 34b and which are provided with mutual spacing which substantially corresponds to the width of the first contact member 22 so that those foot portions 38a, 38b act as a guide relative to the first contact member 22 which is retained, according to a preferred embodiment, in continuation of a rib located on the underside of the upper housing wall 4 spaced apart from the upper housing wall. It is thereby ensured that the second contact member 25 can be displaced along the first contact member 22 after it has been introduced into the interior of the housing 1 in order to be positioned at a location which corresponds to the contacting of one of the conductor rails, after which the second contact member 25 is fixed in position using the groove portions 29a to 29d in that, for example, according to FIG. 5, the second contact member 25 is displaced perpendicularly upwards relative to the first contact member 22 until the feet 34a, 34b are introduced into the corresponding catch recesses 36a, 36b, preferably in the form of openings. A tooth-like construction of the ends of the feet 34a, 34b ensures engagement of the feet 34a, 34b relative to the upper housing wall 4.

In a preferred embodiment according to FIG. 6, the accommodating housing 32 is provided at the upper side and the lower side thereof with openings 40a, 40b, as can clearly be seen in FIGS. 6 and 7. A contact portion 42a, 42b of the contact member 25 extends out of the accommodating housing 32 through those openings 40a, 40b, whereby the contacting with respect to the first contact member 22 and the associated conductor rail 16 to 20 is ensured. The contact portions 42a, 42b are urged apart by resilient means preferably in the form of a helical spring 26, if necessary, whereby it is necessary to ensure that the contact portions 42a, 42b extend slightly beyond the accommodating housing 32 in order to ensure the above-mentioned electrical contacting.

It is apparent from FIGS. 5 to 7 that, although the contact 25a is substantially U-shaped, the contact portions 42a, 42b are bent or bulge out of that U-shaped construction and have greater spacing between each other than the end portions 25b, 25c of the contact member 25. As a result, the contact 25a remains securely inside the accommodating housing 32 after it has been inserted into the accommodating housing 32.

A handle 43 which is constructed on the accommodating housing 32 and which preferably protrudes perpendicularly downwards from the accommodating housing 32 serves to actuate the second contact member 25 and allows the displacement or gripping of the second contact member 25 along the first contact member 32.

A guide means 44 which, in the embodiment illustrated, is formed by a web 44a which is cut out in a tongue-like manner and which has a projection 44b formed thereon is provided on the outer face of the second contact member 25. The web 44a is fitted to the accommodating housing 32 and constructed so as to be flexible owing to U-shaped slots. The projection 44b, preferably in the form of a hemisphere, is located at the end of the web 44a. The same arrangement is on the opposite side of the accommodating housing 32 not visible in FIG. 7.

The portions complementary to the guide means 44 are formed by the guide recess 28, the guide means 44 and the guide recess 28 corresponding to each other. The guide means 44 is displaced along the groove 28 and introduced into one of the groove portions 29a to 29d, depending on the desired position of the second contact member 25. Accordingly, the groove portions 29a to 29d can form hemispherical recesses in order to accommodate the hemispherical projection 44b in an engaging manner. That construction enables the second contact member 25 to be moved into its operational position after it has been introduced into the housing interior, which is possible by means of the insertion grooves 30 by the guide means 44 being displaced into the grooves 28 by a pair of insertion grooves 30. Afterwards, the second contact member 25 is displaced along the grooves 28 in order then to be displaced by one of the groove portions 29a to 29d into the end position, in which the feet 34a, 34b are displaced by the catch recesses 36a, 36b. The grooves 28 are opposite each other at the inner faces of the two side walls 2, 3, as, accordingly, are the insertion grooves 30.

In a developed embodiment of the invention, there is provision for the guide means 44 at the two sides of the accommodating housing 32 to be selected so as to be of different sizes; accordingly, the insertion grooves 30 and grooves 28 formed in the two housing walls 2, 3 are constructed so as to be of different sizes with the purpose of preventing the second contact member from being inserted with incorrect alignment.

The introduction of the second contact member 25 is carried out in that, after the housing 1 has been provided, the second contact member 25 is pressed into the housing at a predetermined location which is determined by the insertion grooves 30, after which the guide means 44 can slide along the mutually parallel grooves 28 in the side walls 2, 3 of the housing 1 in order to displace the second contact member 25 along the grooves 28 as far as a position in which the second contact member 25 is engaged in the above manner in order to contact one of the conductor rails 16 to 20 by the second contact member 25 being displaced in the direction towards the upper housing wall 4 until the two feet 34a, 34b are displaced and engaged in associated catch recesses 36a, 36b.

In another embodiment of the invention, a locking means 46 is displaceably arranged in the housing 1. The locking means 46 is preferably provided so as to be adjustable in a guide 47 which extends perpendicularly to the longitudinal axis of the housing 1 (FIG. 3 and FIG. 4) and is preferably arranged at one end of the housing 1, as can be seen in FIG. 3 and FIG. 4. After the housing 1 has been positioned on the conductor rails 16 to 20, the housing 1 is displaced downwards by the locking means 46 in FIG. 3 and FIG. 4 being displaced so far that the end thereof moves into abutment against a lateral edge of the conductor rail 20, after which the housing 1 is locked against displacement relative to the conductor rails 16 to 20 because the individual feet 8 to 11 and 8' to 11' engage under the conductor rails in a non-positive manner and partially surround them. The number of feet 8 to 11, 8' to 11' does not, as shown in FIG. 2, have to be equal to the number of conductor rails.

The catch recesses 36a, 36b, preferably in the form of openings, simultaneously act, for the operator, as an indicator of the position at which the second contact member is inserted in the housing.

Locking engagement of the feet 34a, 34b relative to the upper housing wall 4 is ensured by the tooth-like construction of the ends of the feet 34a, 34b. In order to move the second contact member 25 out of a position once inserted, it is possible to carry out the unlocking of the feet 34a, 34b by means of a screwdriver or another tool if it is desirable either to remove the second contact member or to displace it along the housing 1 to another position.

As is visible in FIG. 1, there are provided, on the outer faces of the housing side walls 2, 3 according to a preferred embodiment, coupling means 48, 49 in order to be able to assemble a plurality of such one-pole adapters to form an adapter module which, as a common group, for example, comprising five individual adapters, to contact a current collection rail system which comprises five conductor rails, as can be seen for example, from FIGS. 2 and 3. In the embodiment according to FIG. 1, the coupling means 48, 49 comprise, for example, openings which can contain a locking tooth arrangement. In that embodiment, the opposing coupling means of the adjacent adapter is formed so as to have tooth-like projections, it being possible for the coupling means generally to have different and known constructions. The lengths of the feet 8 to 11 or 8' to 11' are configured in accordance with the configuration of the conductor rails which can be constructed so as to be upright or horizontal according to FIGS. 2 and 3.

The housing 1 is preferably produced in one piece and contains the first contact member 22 in the form of a rail. Such adapter modules can be positioned on rail systems with at least three, four or five poles, the feet 8 to 11, 8' to 11' engaging behind the conductor rails in the operating position. In the embodiment illustrated, the contact member 25 can be displaced, after it has been introduced into the housing 1, along the first contact member 22 and consequently along the longitudinal axis of the housing 1 until it is pressed upwards into the definitive operating position at a predetermined position in FIGS. 1 to 3. A corresponding number of pairs of openings 36a, 36b which act as catch recesses for the second contact member 25 at the predetermined operating position are constructed in the upper wall 4 of the housing 1 in accordance with the number of conductor rails.

In another preferred embodiment, there is provided at the front side formed by the column 14 a viewing aperture 51, through which it is possible to view the housing interior and whereby it is possible to see the position at which the second contact member is located.

The invention preferably provides a one-pole adapter, in which the second contact member 25 can be readily displaced into the desired operating position as supplied. Resetting the second contact member 25 is preferably possible only by means of a tool. In order to improve the visibility of the position of the second contact member 25, the housing 1 can be provided with an indicator which allows a viewer to see, via the viewing aperture 51, which conductor rail has been contacted.

In the embodiments illustrated, the openings 40a, 40b formed in the accommodating housing 32 are provided according to FIG. 5 preferably in alignment in a vertical direction so that the contact portions 42a, 42b of the U-shaped contact member 25 are provided symmetrically relative to each other.

The insertion grooves 30 on the inner faces of the side walls 2, 3 of the housings extend away from each groove 28 according to FIG. 4. and extend as far as the lower edge of the side walls 2, 3, respectively. The grooves 28 extend in the direction of the longitudinal axis of the housing 1 over a length which corresponds to the positioning locations of the second contact member 25.

As is apparent from the above description, the accommodating housing 32 of the second contact member 25 has two mutually opposing side walls, on which the guide device 44 is provided, respectively.

FIG. 8 is an illustration of a preferred embodiment of the adapter according to the invention in accordance with FIG. 1, but in the form of a sectional view. Parts which are the same in relation to the preceding Figures are indicated with the same reference numerals.

In the embodiment according to FIG. 8, there is fitted to the feet 9, 9' an extension 60, which is preferably nose-like in shape and which is provided at a position of the foot 9 or 9' at a distance from the housing 1 corresponding to the thickness of the conductor rail 16. The extension 60 can also be formed by a rib which extends vertically at the feet 9 or 9', or the like.

As is visible in FIGS. 1 and 8, there is further provided on the housing 1a bulkhead wall 1a which is preferably part of the housing 1 and which extends vertically downwards from the housing 1 so that no access to the conductor rails is permitted in the operating state from the side of the bulkhead wall 1a. At the inwardly directed side, the bulkhead wall 1a is provided with an extension 61 which is of nose-like form or in the form of a rib extending vertically on the bulkhead wall 1a according to FIG. 8 and which has, in accordance with the extension 60, spacing from the housing 1 that substantially corresponds to the thickness of the conductor rail 20.

Adapters of the type described are generally composed of a combination of three adapters plus an adapter for the N conductor, that is to say, a module comprising a total of four individual adapters is used. For measurement purposes, those adapters forming a module must often be separated from the conductor rails 16, 17, etc. In order to prevent the lines or connections with respect to the devices on the adapter from having to be removed, the operator pushes the four-pole module upwards, that is to say, horizontally to the left in FIG. 8, whereby the conductor rails 16, 17, etc., move out of engagement with the feet which exert a clamping function. The module comprising the adapters is moved into a so-called park position so that the individual contact members 25 retain such a distance, relative to the conductor rail, that a flow of electric current between the associated conductor rail and the contact member 25 is impossible. In such a park position, the extensions 60, 61 engage under an associated conductor rail 16 or 20, respectively, with the result that the entire housing cannot inadvertently be lifted completely from the conductor rails 16 to 20, but instead remains in the park position.

The provision of the extensions 60, 61 is not limited to the feet 9 or 9' and the bulkhead wall 1a, but instead the extensions may be provided additionally or alternatively on the feet 10 or 10', 11 or 11' in a corresponding position.

Another embodiment of an adapter which is illustrated in FIG. 9 in section is preferably an adapter for the N conductor. In this embodiment, the adapter illustrated in FIG. 9 is provided with a fixed contact member 63 which contacts the associated N conductor in the operating state. Alternatively, the adapter can be constructed according to FIGS. 1 to 8 so as to have an adjustable contact member 25. The significant aspect is that the adapter for the N conductor is provided according to a preferred embodiment with a catch means 64 which is adjustable transversely relative to the longitudinal axis of the housing 1 and which can be displaced "downwards" in FIG. 9 when the module comprising individual adapters according to FIG. 8 takes up the park position in order to move into abutment, for example, laterally relative to the conductor rail 20, whereby displacement of the housing 1 is prevented in the longitudinal direction of the housing 1' out of the park position mentioned. In the embodiment according to FIG. 9, the catch means 64 comprises a pin which can be displaced inside a guide 65 which extends transversely relative to the housing axis, to such an extent that at least a portion of the associated conductor rail 20 is engaged over laterally according to FIG. 9. After the catch means 64 has been moved back so far that the conductor rail 20 is released, the housing 1 in FIG. 1 can be pushed to the right, that is to say, "downwards", on the entire conductor rails.

It should be noted, with regard to the terms "up" and "down", that the housing 1 is typically positioned on the conductor rails which extend in a vertical plane so as to be rotated by 90° in a clockwise direction counter to FIGS. 1 to 9. The conductor rails are typically provided in a vertical arrangement in a cabinet or the like. This means that the adapters, individually or assembled as modules, are positioned from above on the conductor rails and are displaced downwards for engagement with the feet 9, 9', etc.

With regard to the embodiment according to FIG. 9, it should be noted that the catch means 64 with the associated guide 65 can also be provided in the modules illustrated in FIGS. 1 to 8 and therefore does not only have to be provided in the adapter for the N conductor according to FIG. 9.

The catch means 64 preferably formed by a pin is preferably displaced out of the securing position (illustrated in FIG. 9) by means of a screwdriver, in that the screwdriver is introduced above the bulkhead wall 1a through an opening designated 66 and engages under a head designated 64a of the catch means 64.

Such a catch means 64 can also be provided an adapter according to FIGS. 1 to 7, if desirable.

In order to securely fix or retain the modules preferably comprising a plurality of adapters in the operating position, all the locking means 46 provided on the adapters are preferably activated or pressed in the direction towards the conductor rails, whilst the catch means 64 according to FIG. 9 remains inoperative in the operating position of the adapter.

List of Reference Numerals

1 Housing
2,3 Housing side wall
4 Upper housing wall
5,6 Rail
8, 9, 10, 11 Feet
8', 9', 10', 11' Feet
13 Accommodating column
14 Side wall
15 Installation device
16, 17, 18, 19, 20 Conductor rails
22 First contact member
23 Bent portion
25 Second contact member
25a Contact
26 Helical spring
28 Groove → guide recess
29a, 29b, 29c, 29d Groove portions
30 Insertion groove
32 Accommodating housing
34a, 34b Feet→ catch means
36a, 36b Catch recesses (opening)
38a, 38b Foot portion
40a, 40b Aperture
42a, 42b Contact portion
43 Handle
44 Guide means
44a Web
44b Projection
46 Locking means
47 Guide
48, 49 Coupling means
51 Viewing aperture
L1, L2, L3, N, PE Conductors

The invention claimed is:

1. An adapter for accommodating electrical installation devices and for fixing to a conductor rail system, comprising a housing which is made of plastics material and comprises an upper housing wall, said housing wall comprising units for mounting an electrical installation device said adapter further comprising feet for fixing to said conductor rail system by gripping and a first contact member for connecting said electrical installation device, wherein the first contact member is extending at least substantially within the housing, and the second contact member is electrically connected to said first contact member, for contacting a respective one of said conductor rails of said conductor rail system, said housing comprising a guide recess, said second contact member being provided so as to be displaceable along said guide recess within said housing, wherein the second contact member comprises a guide unit and catch units and wherein said housing is provided with catch recesses which are provided in predetermined catch positions of the housing, wherein said catch units of the second contact member can be brought into engagement with said catch recesses.

2. An adapter according to claim 1, wherein the first contact member is provided with a contact rail, said contact rail is extending below the upper housing wall in the housing and is provided with a connection device.

3. An adapter according to claim 1 wherein the second contact member comprises an accommodating housing on which the guide unit is formed, and wherein each guide recess is provided on the inner faces of the side walls of the housing and the second contact member can being displaceable along the inner faces of the side walls by using the guide unit.

4. An adapter according to claim 1, wherein the second contact member comprises an accommodating housing on which the guide unit is formed, wherein each guide recess is provided on the inner faces of the side walls of the housing, the second contact member can being displaceable along the inner faces of the side walls by using the guide unit, wherein the accommodating housing of the second contact member comprises at least two apertures, wherein further contact of the second contact member comprises a contact with contact portions which are arranged in the accommodating housing and project out of the accommodating housing at least in part.

5. An adapter according claim 1, wherein the guide recesses are formed as grooves extending along the inner faces of the side walls of the housing, said adapter further comprising groove portions which are provided at points corresponding to the catch positions of the second contact member and extend transversely to the guide recess, into which the guide unit of the accommodating housing can be slid to position the second contact member in a predetermined operating position.

6. Adapter according to claim 1, wherein said contact member comprises an accommodating housing having side walls on which said guide unit is provided.

7. An adapter according to claim 1, wherein a guide unit is provided on each side of the accommodating housing and wherein said guide units are formed different from each other.

8. An adapter claim 1, wherein the accommodating housing is provided with handle extending from the accommodating housing.

9. An adapter according claim 1, wherein the catch unit of the second contact member is formed by at least one pair of feet which protrude from the accommodating housing, and the catch recesses in the housing are formed by openings in the upper housing wall.

10. An adapter according claim 1, wherein the guide unit of the second contact member is formed by cut-out flexible webs, and is provided with a projection on each web.

11. An adapter according to claim 1, wherein the catch unit of the second contact member is formed by at least one pair of feet which protrude from the accommodating housing, and the catch recesses in the housing are formed by openings in the upper housing wall, wherein the feet which form a catch mechanism are provided with catch teeth on the ends thereof.

12. An adapter according claim 1, wherein the upper wall of the housing comprises a lower face which is provided with a rib to separate the first contact member from the upper wall.

13. An adapter according claim 1, wherein the accommodating housing is provided with mutually separated foot portions, the spacing between which is greater than the width of the first contact member and wherein the foot portions are provided for guiding the second contact member relative to the first contact member.

14. An adapter according to claim 1 wherein the guide recesses are formed by grooves and each groove each comprises an insertion groove for inserting the second contact member into the housing.

15. An adapter according to claim 1, wherein said housing comprises side walls which are provided with coupling means for connection to a further adapter.

16. An adapter according to claim 1, wherein said housing comprising a guide locking mechanism, which is provided so as to be displaceable in said guide, so as to lock the housing relative to the conductor rail system.

17. An adapter according to claim 1, wherein at least some of the feet are provided with extensions which are placed at a distance from the housing approximately corresponding to the thickness of the relevant conductor rail.

18. An adapter according claim 1, wherein said extensions are placed at a distance from the housing approximately corresponding to the thickness of the relevant conductor rail.

19. An adapter according to claim 1, wherein at least some of the feet are provided with extensions which are placed at a distance from the housing approximately corresponding to the thickness of the relevant conductor rail, and wherein an extension, the distance of which from the housing approximately corresponds to the thickness of the associated conductor rail, is formed on an outer wall of the housing.

20. An adapter according to claim 1, wherein at least some of the feet are provided with extensions which are placed at a distance from the housing approximately corresponding to the thickness of the relevant conductor rail, and wherein the extension is formed by a rib which extends perpendicular to the longitudinal axis of the housing.

* * * * *